(12) United States Patent
Caimi et al.

(10) Patent No.: US 10,680,420 B2
(45) Date of Patent: Jun. 9, 2020

(54) JOINT FOR ELECTRIC CABLES WITH THERMOPLASTIC INSULATION AND METHOD FOR MANUFACTURING THE SAME

(71) Applicant: PRYSMIAN S.P.A., Milan (IT)

(72) Inventors: Luigi Caimi, Milan (IT); Luigi De Martino, Milan (IT)

(73) Assignee: PRYSMIAN S.P.A., Milan (IT)

( * ) Notice: Subject to any disclaimer, the term of this patent is extended or adjusted under 35 U.S.C. 154(b) by 29 days.

(21) Appl. No.: 15/769,119

(22) PCT Filed: Oct. 23, 2015

(86) PCT No.: PCT/IB2015/058193
§ 371 (c)(1),
(2) Date: Apr. 18, 2018

(87) PCT Pub. No.: WO2017/068398
PCT Pub. Date: Apr. 27, 2017

(65) Prior Publication Data
US 2018/0309273 A1 Oct. 25, 2018

(51) Int. Cl.
*H02G 1/14* (2006.01)
*H02G 1/12* (2006.01)
*H02G 15/08* (2006.01)

(52) U.S. Cl.
CPC .............. *H02G 1/14* (2013.01); *H02G 1/1273* (2013.01); *H02G 15/08* (2013.01)

(58) Field of Classification Search
CPC ....... H02G 31/1273; H02G 15/08; H02G 1/14
See application file for complete search history.

(56) References Cited

U.S. PATENT DOCUMENTS 4,204,896 A 5/1980 Richardson
4,233,096 A * 11/1980 Wiberg .................... H02G 1/12
156/49

(Continued)

FOREIGN PATENT DOCUMENTS

NL 6 603 955 A 10/1966

OTHER PUBLICATIONS

International Search Report and Written Opinion of the International Searching Authority dated Jul. 13, 2016 in PCT/IB2015/058193, 11 pages.

*Primary Examiner* — Dimary S Lopez Cruz
(74) *Attorney, Agent, or Firm* — Oblon, McClelland, Maier & Neustadt, L.L.P.

(57) ABSTRACT

A method for manufacturing an electric cable joint is described. The method includes: a step of providing two electric cables, each cable containing an electric conductor and a thermoplastic insulation system surrounding the electric conductor and containing an inner and an outer thermoplastic semiconducting layers and a thermoplastic insulating layer; a step of joining the terminal portions of the electric conductors of the first and second electric cables to form an electric conductor joint; a step of surrounding the electric conductor joint with a joint inner layer of a thermoplastic semiconducting material having a dynamic storage modulus $E'_1$; a step of surrounding the joint inner layer with a joint insulating layer of a thermoplastic insulating material having a dynamic storage modulus $E'_2$ smaller than $E'_1$; and a step of surrounding the joint insulating layer with a joint outer layer of a thermoplastic semiconducting material having a dynamic storage modulus $E'_3$.

12 Claims, 2 Drawing Sheets

(56) References Cited

U.S. PATENT DOCUMENTS

| | | | | |
|---|---|---|---|---|
| 6,881,903 B2* | 4/2005 | Greiner | ............... | H01B 7/0892 |
| | | | | 174/113 R |
| 8,383,012 B2* | 2/2013 | Galletti | ................... | H01B 1/24 |
| | | | | 252/511 |
| 9,697,925 B2* | 7/2017 | Allais | ................... | H01B 3/441 |
| 10,177,468 B2* | 1/2019 | Allais | ................... | H01B 3/004 |

* cited by examiner

JOINT FOR ELECTRIC CABLES WITH THERMOPLASTIC INSULATION AND METHOD FOR MANUFACTURING THE SAME

BACKGROUND OF THE INVENTION

The present invention relates generally to medium/high voltage electric cable connections. More particularly, the invention relates to a joint for medium/high voltage electric cables having a thermoplastic insulation system, and to a method for manufacturing the same.

Cables for transporting electric energy, particularly in the case of cables for medium or high voltage applications, include at least one cable core. The cable core is usually formed by an electrically conductive metal conductor sequentially covered by an insulation system. The insulation system is sequentially formed by an inner polymeric layer having semiconducting properties, an intermediate polymeric layer having electrically insulating properties, and an outer polymeric layer having semiconducting properties.

Cables for transporting electric energy at medium or high voltage generally include a screen layer surrounding the cable core, typically made of metal or of metal and polymeric semiconducting material. The screen layer can be made in form of wires (braids), of a tape helically wound around the cable core, or of a sheet longitudinally wrapped around the cable core.

The layers of the cable insulation system are commonly made from a polyolefin-based cross-linked polymer, in particular cross-linked polyethylene (XLPE), or elastomeric ethylene/propylene (EPR) or ethylene/propylene/diene (EPDM) copolymers, also cross-linked. The crosslinking step, carried out after extruding the polymeric material onto the conductor, gives the material satisfactory mechanical and electrical properties, even under high temperatures, both during conventional use and with current overload.

The crosslinking process of the polyolefin materials of the cable insulation system, particularly polyethylene (XLPE), requires addition to the polymeric material of a crosslinking agent, usually an organic peroxide, and subsequent heating at a certain temperature to cause peroxide cleavage and reaction. By-products are formed mainly from the decomposition of the organic peroxide, which may cause an accumulation of space charges and consequently electrical discharges and eventually insulation piercing, particularly in direct current (DC) energy cables. Therefore, the by-products of the crosslinking process must be removed by a long and cumbersome process of degassing, which is carried out, usually at a temperature of about 70° C.÷80° C., for a time from 15 days to about 2 months, depending on the cable dimensions, to cause migration and subsequent evaporation of the by-products from the cable core.

Energy cable accessories are used in an energy network to restore the insulation and electric field control over a cable portion where the conductor was exposed, such as in case of connection between two energy cables or between an energy cable and another network component, such as a transformer, a generator, a bare conductor of an overhead line or the like.

For medium/high voltage electric cables, joints can be built over the conductor connection by winding tapes of suitable materials in order to rebuild the insulating system of the cable, namely the inner semiconducting layer, the insulating layer and the outer semiconducting layer. As described by Thomas Worzyk, "*Submarine Power Cables: Design, Installation, Repair, Environmental Aspects*", Chapter 4, Springer-Verlag Berlin Heidelberg 2009, this method is particularly suitable for joining high voltage cables for submarine installations, since it allows to obtain a joint (hereinafter referred to as "diameter joint") which has a diameter slightly thicker than that of the joined cables, differently from the pre-moulded joints which inevitably have a diameter remarkably larger than the diameters of the joined cables. This allows an easier handling of the joined cables, especially when the joined cables are to be wound over a reel and then unwound for installation.

A proper and reliable rebuilding of the layers of the insulation system is essential to guarantee that the joint has the same performances, both thermo-mechanical and electrical, of the remaining portions of the cable insulation system. More in detail, the rebuilding of a diameter joint requires the use of tapes made with substantially the same materials of the cable insulation system, which are sequentially applied by winding them in a very accurate and clean way, to avoid formation of voids or other defects due to impurities which can give place to electric problems, such as partial discharge. Once the winding of the tape corresponding to the first inner layer of the cable insulation system is completed, the applied material is melted to become a continuous and homogeneous layer and then is cured under pressure to provide dimensional stability and to avoid deformation of the insulating system during deployment. The pressure applied during the curing step should be sufficient both to avoid formation of pores in the cured material, due to cross-linking by-product escaping, and to guarantee correct dimensions to the layer. This tape winding procedure is then repeated for the remaining two layers of the cable insulation system. The previous layer, i.e. the layer already wound around the cable, eludes deformation when the next layer is processed (by imparting a predefined pressure at a certain temperature to obtain crosslinking), because the previous layer is crosslinked.

For example, U.S. Pat. No. 4,204,896 discloses a method for producing an insulated joint between electrical conductors wherein heat is applied to the joined parts of the conductors covered by a cross-linked polyethylene material, that is in an uncured conditions and is closely confined within an enclosure. The enclosure is heated until the polyethylene material is cured, and pressure is applied to the joint in the enclosure while the joint is cooled, whereby the formation and/or persistence of voids in the cured joint is substantially suppressed.

In recent years, thermoplastic solutions have been developed in the field of medium and high voltage cables, in which the thermoplastic layers of the cable insulation system are based on polypropylene blends in admixture with an insulating fluid, as disclosed, for example in WO 02/27731 and WO 2004/066317. This solution avoids the crosslinking process.

SUMMARY OF THE INVENTION

For joining cables with thermoplastic insulation system by a thermoplastic diameter joint, the procedure is as that described above for cross-linked material, but it cannot rely upon curing for stabilization. Heating a thermoplastic tape over an already applied thermoplastic layer can cause thermal deformations of the latter and, accordingly, loss of dimensional stability and uniformity of the overall joint.

More specifically, the Applicant has experienced that the application of a subsequent thermoplastic layer, preferably made of wound tapes, onto a non-cross-linked layer, which is not stabilized by curing, may cause the deformation of the latter, due to the heating applied on the subsequent layer. Actually, in order to guarantee a complete homogenization and void absence, the tape windings should be at least softened, if not even melted. However, the heating of a thermoplastic tape can cause softening and even melting of an underlying thermoplastic layer with consequent deformation. This is particularly critical in the case of the application of the insulating layer as it has a remarkable thickness and, accordingly, it takes a prolonged heating for a complete melting.

The Applicant has also experienced that, in the case of thermoplastic layers, pressure is of no help for improving homogeneity and suppressing the formation/persistence of voids, as envisaged in the case of cross-linked material. On the contrary, pressure greater than the atmospheric one could bring further deformation on an already applied thermoplastic layer.

The Applicant found that a dimensionally stable and electrically reliable diameter joint for medium/high voltage cables with thermoplastic insulating system can be obtained by coating the connected conductors with a thermoplastic insulating system where the insulating layer has a dynamic storage modulus E' measured at a temperature of at least 130° C., said dynamic storage modulus E' being lower than that of the inner semiconducting layer measured at the same temperature.

Therefore, according to a first aspect, the present invention relates to a method for manufacturing an electric cable joint comprising providing a first electric cable and a second electric cable. Each cable comprises at least one electric conductor and a thermoplastic insulation system surrounding the electric conductor. The thermoplastic insulation system comprises an inner thermoplastic semiconducting layer, a thermoplastic insulating layer and an outer thermoplastic semiconducting layer.

The method comprises joining respective terminal portions of the electric conductors of the first electric cable and of a second electric cable placed axially adjacent to the first electric cable, to form an electric conductor joint; surrounding the electric conductor joint with a joint inner layer of a first thermoplastic semiconducting material having a first dynamic storage modulus; surrounding the joint inner layer of a first thermoplastic semiconducting material with a joint insulating layer of thermoplastic insulating material having a second dynamic storage modulus, and surrounding the joint insulating layer of thermoplastic insulating material with an joint outer layer of a second thermoplastic semiconducting material. The first dynamic storage modulus of the first thermoplastic semiconducting material of joint inner layer is greater than the second dynamic storage modulus of the thermoplastic insulating material of the joint insulating layer, the dynamic storage moduli being measured at a substantially same measurement temperature of at least 130° C.

The temperature for measuring the dynamic storage moduli is preferably lower than 200° C., more preferably up to 180° C.

The specific measurement temperature suitable for evaluating and comparing the dynamic storage moduli of the thermoplastic materials of the invention can vary from case to case, according to the specific thermoplastic materials employed. The measurement temperature can be advantageously selected on the basis of the melting temperature of the thermoplastic insulating material of the joint insulating layer, which is the thickest layer to be deposited in an electric cable joint. For example, the temperature suitable for measuring and comparing the dynamic storage moduli of the thermoplastic materials of the invention can be 10° C. lower than the melting temperature of the thermoplastic insulating material of the joint insulating layer.

Advantageously, the first dynamic storage modulus of the first thermoplastic semiconducting material of the joint inner layer is more than 20% greater, preferably more than 50% greater, even more preferably more than 100% greater, than the second dynamic storage modulus of the thermoplastic insulating material of the joint insulating layer, the moduli being measured at a substantially same measurement temperature of at least 130° C.

According to another aspect, the present invention relates to a joint for connecting a first electric cable and a second electric cable, each cable having an electric conductor and a thermoplastic insulation system surrounding the electric conductor. The joint comprises a joint inner layer of a first thermoplastic semiconducting material, having a first dynamic storage modulus and surrounding the electric conductors, a joint insulating layer of thermoplastic insulating material, having a second dynamic storage modulus and surrounding the joint inner layer of a first thermoplastic semiconducting material, and a joint outer layer of a second thermoplastic semiconducting material, surrounding the joint insulating layer of a thermoplastic insulating material, wherein the first dynamic storage modulus is greater than the second dynamic storage modulus, the dynamic storage moduli being measured at a substantially same measurement temperature of at least 130° C.

The joint of the present invention is advantageously a diameter joint.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, use of the "a" or "an" are employed to describe elements and components of the invention. This is done merely for convenience and to give a general sense of the invention. This description should be read to include one or at least one, and the singular also includes the plural unless it is obvious that it is meant otherwise.

In the present description and claims, the term "high voltage" generally means a voltage higher than 35 kV.

As "insulating element" it is meant an element made of a material having electrically insulating properties, namely having a dielectric rigidity (dielectric breakdown strength) of at least 5 kV/mm, preferably of at least 10 kV/mm.

As "semiconducting layer" it is meant a layer made of a material having semiconductive properties, such as a polymeric matrix added with, e.g., carbon black such as to obtain a volumetric resistivity value, at room temperature, of less than 500 Ω·m, preferably less than 20 Ω·m, for example of 1 Ω·m. The amount of carbon black can range between 1% and 50% by weight, preferably between 3% and 30% by weight, relative to the weight of the polymer.

As "dynamic storage modulus" it is meant a component of the dynamic modulus. In the dynamic mechanical analysis (DMA) of a polymeric material the dynamic storage modulus E', measured in megapascal (MPa), is defined as:

$$E' = \frac{\sigma}{\varepsilon}\cos\delta$$

wherein: σ is the oscillatory force applied to a sample of the specific polymeric material;
ε is the resulting strain of said sample of the polymeric material;
δ is the phase lag between force and strain.

BRIEF DESCRIPTION OF THE DRAWINGS

Further characteristics will be apparent from the detailed description given hereinafter with reference to the accompanying drawings, in which.

DETAILED DESCRIPTION OF THE PREFERRED EMBODIMENTS

Figure 1:
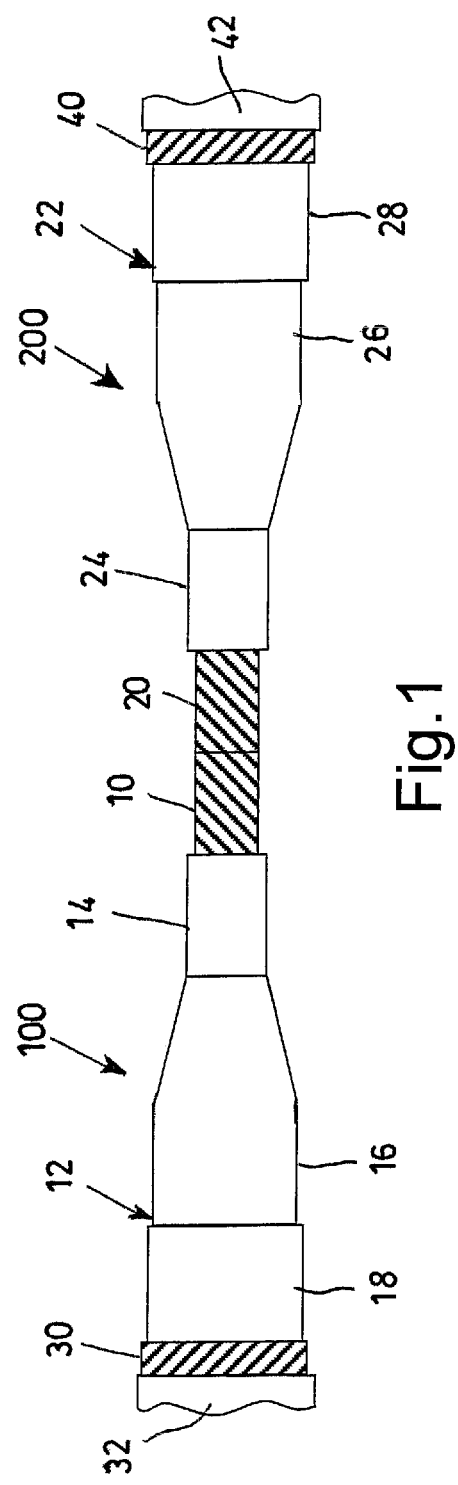
FIG. 1 is a side view of a medium/high voltage electric cable, shown during an initial step of the method for manufacturing a joint according to the present invention.

In FIG. 1 a first electric cable 100 and a second electric cable 200 are schematically represented. The first electric cable 100 and the second electric cable 200 are placed axially adjacent one to another, so as to be subsequently joined together.

Each cable 100, 200 comprises an electric conductor 10, 20 and an insulation system 12, 22 surrounding the respective electric conductor 10, 20. The insulation system 12, 22 comprises an inner thermoplastic semiconducting layer 14, 24 that encircles and is in direct contact with the respective electric conductor 10, 20 of the electric cable 100, 200. The insulation system 12, 22 of each electric cable 100, 200 further comprises a thermoplastic insulating layer 16, 26 that encircles and is in direct contact with the inner thermoplastic semiconducting layer 14, 24, and an outer thermoplastic semiconducting layer 18, 28 that encircles and is in direct contact with the thermoplastic insulating layer 16, 26. The insulation system 12, 22 of each electric cable 100, 200 is then sequentially surrounded by a metal screen 30, 40 and by one or more outer jackets 32, 42 made, for example, of polyethylene.

Figure 2:
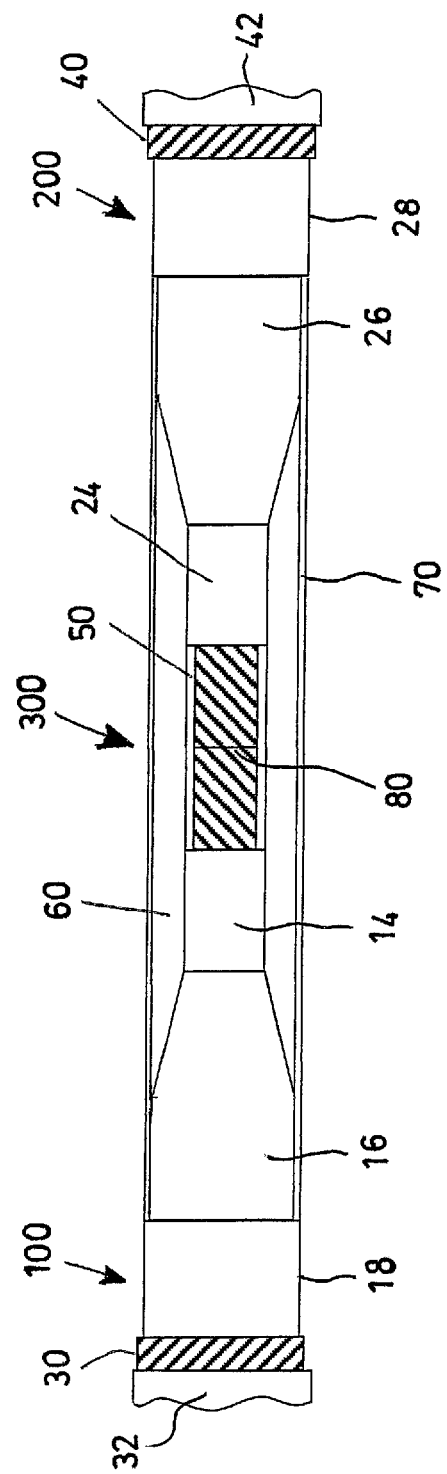
FIG. 2 is a cross-section view of the medium/high voltage electric cable of FIG. 1, at the completion of the method for manufacturing a joint according to the present invention.

In FIG. 2 a joint 300 for joining together the first electric cable 100 and the second electric cable 200 is schematically represented in cross-section. The joint 300 comprises a joint inner layer 50 made of a first thermoplastic semiconducting material, a joint insulating layer 60 made of a thermoplastic insulating material, and a joint outer layer 70 made of a second thermoplastic semiconducting material. The joint inner layer 50, the joint insulating layer 60 and the joint outer layer 70 are respectively configured for rebuilding the inner thermoplastic semiconducting layer 14, 24, the thermoplastic insulating layer 16, 26 and the outer thermoplastic semiconducting layer 18, 28 of the cable insulation system 12, 22.

The method for manufacturing the joint 300 comprises the step of joining respective terminal portions of the electric conductors 10, 20 of the first 100 and the second 200 electric cables, so as to form an electric conductor joint 80. The electric conductor joint 80 can be obtained, for example, through a compression clamp if the electric conductors 10, 20 are made of copper, or through metal inert gas (MIG) welding if the electric conductors 10, 20 are made of aluminium.

The method for manufacturing the joint 300 further comprises the step of surrounding the electric conductor joint 80 with the joint inner layer 50 made of a first thermoplastic semiconducting material having a first dynamic storage modulus $E'_1$.

The dynamic storage modulus E' rates the stored energy of a specific polymeric material when a sinusoidal force (stress σ) is applied to said material and the resulting displacement (strain ε) is measured.

The method for manufacturing the joint 300 further comprises the step of surrounding the joint inner layer 50 with the joint insulating layer 60 made of thermoplastic insulating material having a corresponding second dynamic storage modulus $E'_2$. Thereafter, the joint insulating layer 60 is surrounded with the joint outer layer 70.

The joint outer layer 70 can be made of a second thermoplastic semiconducting material having a corresponding third dynamic storage modulus $E'_3$.

The dynamic storage modulus $E'_1$, $E'_2$, $E'_3$ of each corresponding joint layer 50, 60, 70 is measured at a temperature of at least 130° C., said measurement temperature being substantially the same for all of the dynamic storage moduli of the electric cable joint.

According to the invention, the thermoplastic materials of the joint 300 are provided such that the first dynamic storage modulus $E'_1$ of the joint inner layer 50 is greater than the second dynamic storage modulus $E'_2$ of the joint insulating layer 60.

Advantageously, the joint outer layer 70 is made of a second thermoplastic semiconducting material having a corresponding third dynamic storage modulus $E'_3$. The second dynamic storage modulus $E'_2$ of the joint insulating layer 60 is at least 10% of the third dynamic storage modulus $E'_3$ of the joint outer layer 70, the dynamic storage moduli being measured at a substantially same measurement temperature of at least 130° C.

In a preferred configuration, each layer of the joint 300 has a dynamic storage modulus E' that is greater than the dynamic storage modulus E' of the radially external layer when measured at a measurement temperature of at least 130° C., said measurement temperature being the same for all of the dynamic storage moduli of the electric cable joint.

However, the joint insulating layer 60 can be made of a thermoplastic material having a second dynamic storage modulus $E'_2$ lower than that of the thermoplastic material of the radially external layer, i.e. the joint outer layer 70, because the joint insulating layer 60 has a thickness significantly greater than that of the joint outer layer 70 (typically from 15 to 30 times greater). This superior thickness allows the joint insulating layer 60 keeping its shape and homogeneity when the thinner joint outer layer 70 is applied thereupon and heated, providing that the second dynamic storage modulus $E'_2$ has a value not lower than 10% of the dynamic storage modulus $E'_3$ of the radially external joint outer layer 70, the dynamic storage moduli being measured at the substantially same measurement temperature of at least 130° C.

Each joint layer 50, 60, 70 can be made in the form of a tape to be helically wound around the electric conductor 10, 20. Each tape is made of a thermoplastic insulating or semiconducting material chemically compatible with and having substantially the same electrical properties of the corresponding thermoplastic insulating or semiconducting material of the corresponding inner 14, 24, intermediate 16, 26 and outer 18, 28 cable layer, so as to restore the cable continuity over the electric conductors 10, 20. Each tape is preferably obtained by extrusion.

Each joint layer 50 in form of tape is wound around the electric conductor joint 80 according to a conventional procedure known in the field of cable joint manufacture. Subsequently, each joint layer 50, 60, 70 is submitted to a heating step to a temperature suitable for melting the thermoplastic material thereof and for converting the material from the shape of a tape winding to a shape of a homogeneous cylinder.

The joint inner layer 50 is submitted to two heating steps further the one for its deposition and homogenization, i.e. the step for melting and homogenization of the joint insulating layer 60 and the step for melting and homogenization of the joint outer layer 70. Analogously, the joint insulating layer 60 is submitted to one heating step further the one for its deposition and homogenization, i.e. the step for melting and homogenization of the joint outer layer 70. The joint outer layer 70 is thus submitted to a single heating step for its own melting and homogenization.

As sketched in FIG. 2, the insulating layer 60 has a thickness significantly greater than the thickness of the joint semiconducting layer 50 and 70. Such a greater thickness results in a longer heat treatment to have the tape/s for obtaining the insulating layer 60 melted and, accordingly, the stability of the already applied joint and underlying semiconducting layer 50 is particularly challenged.

The material used to apply the joint inner layer 50 has the highest thermomechanical resistance in terms of a relatively high dynamic storage modulus $E'_1$, while the material of the joint insulating layer 60 and the material forming the joint outer layer 70 has relatively low dynamic storage moduli $E'_2$, $E'_3$, the dynamic storage moduli being measured at the same measurement temperature.

Each heating step of the thermoplastic joint layers 50, 60, 70 can be performed by enclosing the layer still in form of wound tape in a metal cylindrical case made, for example, of a suitable number of metal slit collars (e.g., copper split collars), which is then connected to a thermocouple. The shape of the cylindrical case—and/or of the slit collars—eases the obtainment of a layer with a suitable shape.

Between the tape to be melted and the cylindrical case various coatings can be provided, to protect the tape from overheating due to direct contact with the metal cylindrical case, to ease the removal of the case or of other coatings at the end of the heating step and/or to mechanically cushion the joint layer 50, 60, 70 during the heating treatment. These coatings can be similar to those known in the art for the manufacturing of cross-linked polymer joints.

The process of the invention is preferably carried out at atmospheric pressure. It has been found that the application of a pressure greater than the atmospheric one not only brings no benefit to the stabilization and homogenization of the joint layers, but also could cause deformation of the joint layers.

The outer layer 70 could also be prepared in a different way with respect to the tape.

The materials used for manufacturing each joint layer 50, 60 and preferably 70 are substantially of the same nature than the corresponding ones of the cable insulation system 12, 22, but the composition of these material is preferably varied in terms of crystallinity content and filler content to reach the desiderata properties.

Preferably, the thermoplastic materials for the insulating system of the electric cables to be joined and, accordingly, of the diameter joint of the present invention and, accordingly, of the electric cables to be joined, can be based on a polypropylene matrix intimately admixed with a dielectric fluid disclosed, for example, in WO 02/03398, WO 02/27731, WO 04/066317, WO 04/066318, WO 07/048422, WO 2011/092533 and WO 08/058572.

The polypropylene matrix useful for thermoplastic cables and relevant joints can be a thermoplastic polymer material selected from:
- at least one copolymer (i) of propylene with at least one olefin comonomer selected from ethylene and an α-olefin other than propylene, said copolymer having a melting point greater than or equal to 140° C. and a melting enthalpy of from 20 J/g to 90 J/g;
- a blend of at least one copolymer (i) with at least one copolymer (ii) of ethylene with at least one α-olefin, said copolymer (ii) having a melting enthalpy of from 0 J/g to 70 J/g;
- a blend of at least one propylene homopolymer with at least one copolymer (i) or copolymer (ii).

Suitable compatibility between the dielectric fluid and the polymer base material is advantageous to obtain a microscopically homogeneous dispersion of the dielectric fluid in the polymer base material. The dielectric fluid suitable for forming the thermoplastic layers of the present invention should comprise no polar compounds, or only a limited quantity thereof, in order to avoid a significant increase of the dielectric losses.

The thermoplastic polymer material is characterized by a relatively low crystallinity such to provide the cable with the suitable flexibility, but not to impair the mechanical properties and thermopressure resistance at the cable operative and overload temperatures. Performance of the cable insulating system is also affected by the presence of the dielectric fluid intimately admixed with said polypropylene matrix. The dielectric fluid should not affect the mentioned mechanical properties and thermopressure resistance and should be such to be intimately and homogeneously mixed with the polymeric matrix.

Once the construction of the joint outer layer 70 has been completed, a screening of each joint layer 50, 60, 70 through an X-ray inspection can be performed, so as to check the presence of any defects or undesired inclusions in one or more of said joint layers 50, 60, 70. One or more X-ray inspections can be carried out on single or couples of joint layers during the electric cable joint construction.

The joint outer layer 70 is finally covered by subsequently rebuilt layers of the metal screen 30, 40 and of the one or more outer jackets 32, 42. The metal screen rebuilding can be performed, for example, with a brazing process, while the outer jackets are usually rebuilt by using polymer (e.g. polyethylene) shrinkable tubes or adhesive tapes.

An example is provided of a diameter joint according to the present invention. The joint comprises the following layers:
- an inner semiconducting layer (IS) made of a 30/70 mixture of a polypropylene random copolymer (melting enthalpy: 65 J/g; density: 0.900 g/cm$^3$; melting temperature: 144° C.) and an ethylene-propylene heterophase copolymer (melting enthalpy: 30 J/g; density: 0.880 g/cm$^3$; melting temperature: 160.5° C.) containing 6 wt % of dibenzyltoluene as dielectric fluid and 65 wt % of carbon black;
- an insulating layer (I) made of an ethylene-propylene heterophase copolymer (melting enthalpy: 30 J/g; density: 0.880 g/cm$^3$; melting temperature: 160° C.) containing 5 wt % of dibenzyltoluene as dielectric fluid;
- an outer semiconducting layer (OS) made of an ethylene-propylene heterophase copolymer (melting enthalpy: 12 J/g; density: 0.870 g/cm$^3$; melting temperature: 154° C.) containing 6 wt % of dibenzyltoluene as dielectric fluid and 40 wt % of carbon black.

The thermoplastic materials of the three joint layers have the characteristics set forth in the following Table 1.

TABLE 1

| Layer | E' @ $T_{room}$ (MPa) | E' @ 130° C. (MPa) | E' @ 150° C. (MPa) | E' @ T > 170° C. (MPa) |
|---|---|---|---|---|
| IS | 417.7 | 39.8 | 10.7 | 4.01 |
| I | 85.8 | 5.2 | 1.5 | <1 |
| OS | 80 | 3.6 | 1.6 | 0.6 |

The evaluation of the dynamic storage moduli of the materials has been made by dynamic mechanical thermal analysis (DMTA) with oscillation strain 0.1%, static force 0.01 N and force track 125%. The test samples had a rectangular shape (length 5÷7 mm; width 4.06 mm; thickness 0.5÷0.7 mm). All samples have been equilibrated at 20° C. for 5 minutes.

The measurement of the dynamic storage moduli of the three joint layers was performed at various measurement temperatures. The difference among modulus values makes the three thermoplastic materials suitable for being part of the same electric joint cable. In particular, the dynamic storage modulus of the inner semiconducting layer (IS) is far greater than that of the insulating layer (I). Such a difference between the dynamic storage moduli provides a suitable safety margin in the electric cable joint manufacturing method.

The invention claimed is:

1. A method for manufacturing an electric cable joint, the method comprising:
    providing a first electric cable and a second electric cable, each cable comprising an electric conductor and a thermoplastic insulation system surrounding the electric conductor;
    joining respective terminal portions of the electric conductors of the first electric cable and of the second electric cable placed axially adjacent to the first electric cable to form an electric conductor joint;
    surrounding the electric conductor joint with a joint inner layer of a first non-crosslinked thermoplastic semiconducting material having a first dynamic storage modulus ($E'_1$);
    surrounding the joint inner layer with a joint insulating layer of a non-crosslinked thermoplastic insulating material having a second dynamic storage modulus ($E'_2$); and
    surrounding the joint insulating layer with a joint outer layer of a second non-crosslinked thermoplastic semiconducting material having a third dynamic storage modulus ($E'_3$),
    wherein the first dynamic storage modulus ($E'_1$) of the first non-crosslinked thermoplastic semiconducting material of the joint inner layer is greater than the second dynamic storage modulus ($E'_2$) of the non-crosslinked thermoplastic insulating material of the joint insulating layer, the dynamic storage moduli ($E'_1$, $E'_2$) being measured at a substantially same measurement temperature of at least 130° C.

2. The method according to claim 1, wherein the first dynamic storage modulus ($E'_1$) is more than 20% greater than the second dynamic storage modulus ($E'_2$).

3. The method according to claim 2, wherein the first dynamic storage modulus ($E'_1$) is more than 50% greater than the second dynamic storage modulus ($E'_2$).

4. The method according to claim 3, wherein the first dynamic storage modulus ($E'_1$) is more than 100% greater than the second dynamic storage modulus ($E'_2$).

5. The method according to claim 1, wherein the second dynamic storage modulus ($E'_2$) is at least 10% of the third dynamic storage modulus ($E'_3$) of the second non-crosslinked thermoplastic semiconducting material of the joint outer layer, the dynamic storage moduli ($E'_2$, $E'_3$) being measured at a substantially same measurement temperature of at least 130° C.

6. The method according to claim 5, wherein the second dynamic storage modulus ($E'_2$) is equal to or greater than the dynamic storage modulus ($E'_3$).

7. The method according to claim 1, wherein
    in the thermoplastic insulation system of each cable, the non-crosslinked thermoplastic insulating layer is in direct contact with the inner non-crosslinked thermoplastic semiconductor layer, and the outer non-crosslinked thermoplastic semiconductor layer is in direct contact with the non-crosslinked thermoplastic insulating layer; and
    the joint insulating layer is in direct contact with the joint inner layer, and the joint outer layer is in direct contact with the joint insulating layer.

8. A joint for joining a first electric cable and a second electric cable, each cable comprising an electric conductor and a thermoplastic insulation system surrounding the electric conductor; the joint comprising:
    a joint inner layer of a first non-crosslinked thermoplastic semiconducting material having a first dynamic storage modulus ($E'_1$) and surrounding the electric conductors of the first and second electric cables;
    a joint insulating layer of a non-crosslinked thermoplastic insulating material having a second dynamic storage modulus ($E'_2$) and surrounding the joint inner layer; and
    a joint outer layer of a second non-crosslinked thermoplastic semiconducting material having a third dynamic storage modulus ($E'_3$) and surrounding the joint insulating layer,
    wherein the first dynamic storage modulus ($E'_1$) of the first non-crosslinked thermoplastic semiconducting material of the joint inner layer is greater than the second dynamic storage modulus ($E'_2$) of the non-crosslinked thermoplastic insulating material of the joint insulating layer, the dynamic storage moduli ($E'_1$, $E'_2$) being measured at a substantially same measurement temperature of at least 130° C.

9. The joint according to claim 8, wherein the second dynamic storage modulus ($E'_2$) is at least 10% of the third dynamic storage modulus ($E'_3$) of the second non-crosslinked thermoplastic semiconducting material of the joint outer layer, the dynamic storage moduli ($E'_2$, $E'_3$) being measured at a substantially same measurement temperature of at least 130° C.

10. The joint according to claim 9, wherein the second dynamic storage modulus ($E'_2$) is equal to or greater than the dynamic storage modulus ($E'_3$).

11. The joint according to claim 8, which is a diameter joint.

12. The joint according to claim 8, wherein
    in the thermoplastic insulation system of each cable, the non-crosslinked thermoplastic insulating layer is in direct contact with the inner non-crosslinked thermoplastic semiconductor layer, and the outer non-crosslinked thermoplastic semiconductor layer is in direct contact with the non-crosslinked thermoplastic insulating layer; and the joint insulating layer is in direct contact with the joint inner layer, and the joint outer layer is in direct contact with the joint insulating layer.

\* \* \* \* \*